INVENTOR.
ARTHUR B. BERTHELMANN

Dec. 18, 1945.   A. B. BERTHELMANN   2,391,120
SPRING MEANS
Filed May 29, 1941   2 Sheets-Sheet 2

INVENTOR.
ARTHUR B. BERTHELMANN
BY Vernon G. Parker

UNITED STATES PATENT OFFICE 2,391,120

SPRING MEANS

Arthur B. Berthelmann, Madison, Wis.

Application May 29, 1941, Serial No. 395,808

7 Claims. (Cl. 267—34)

This invention relates to improvements in spring means.

Coil and/or leaf springs are well known for use as a means of resiliently supporting objects, as for example automobile or truck frames, to protect them against sudden jar as would ordinarily occur by direct connection of the object to the support.

These springs operate successfully within the elastic limit of the material from which they are made according to Hook's law. Once the spring has been stressed beyond the elastic limit of the material from which it is made, it fails to return to its original unsprung condition and thereby loses a certain amount of its resistivity to force.

The spring metal from which the springs are made is subject to failure by fatigue due to repeated flexing thereof over relatively long periods of time.

Under certain conditions of coil spring installation as for example the installation of the so called "knee action" in automobiles and the like, coil springs used therein become fatigued and must be replaced to maintain the proper alignment of parts, and also to maintain proper riding conditions. Since it is a comparatively expensive operation to replace the springs involved in a "knee action" assembly, I have discovered a rectifying or compensator air controlled spring means which may be associated in cooperative relationship with the coil spring to revitalize or restore the "spent" resistivity of the spring to its original condition at a minimum of cost, time and labor.

Under certain conditions of loading, as for example, an overloaded truck or other vehicle, the leaf springs are sprung beyond their normal capacity and therefore do not properly suspend the extra load. The weight must either be reduced to permit proper functioning of the springs or more resistive springs installed. Since it is not economical to reduce the load, and not practical to replace the springs with more resistive ones, since the more resistive ones do not permit proper riding conditions under no load operation of the vehicle, I have discovered that the use of my air-controlled spring means as a helper spring in combination with the leaf springs successfully solves all conditions of loading.

Therefore, one object of my invention is to provide a spring means, the resistivity of which may be directly controlled by the use of a compressible medium, for example air.

Another object is to provide an air-controlled spring means adapted to be operatively associated with a coil or leaf spring, whereby the original resistivity of the springs is restored, or the resistivity of the springs is increased by means of the air-controlled spring means.

A further object is to provide a spring means having an air chamber adapted to provide resistance to external force in proportion to the amount of air confined in the air chamber.

A still further object is to provide an air-controlled spring means having a constricted medial portion which acts to permit biased movement of the ends thereof under pressure exerted thereon.

Yet another object is to provide an air-controlled expansion spring means including a casing having nested sections and being adapted to limit the expansion of the spring means.

Still another object is to provide a spring means assembly including an air controlled spring cushion having means associated therewith whereby the cushion is automatically returned to unsprung position under normal loading conditions.

In the drawings.

Like parts are indicated by the same reference numerals throughout the several views.

Figure 1:
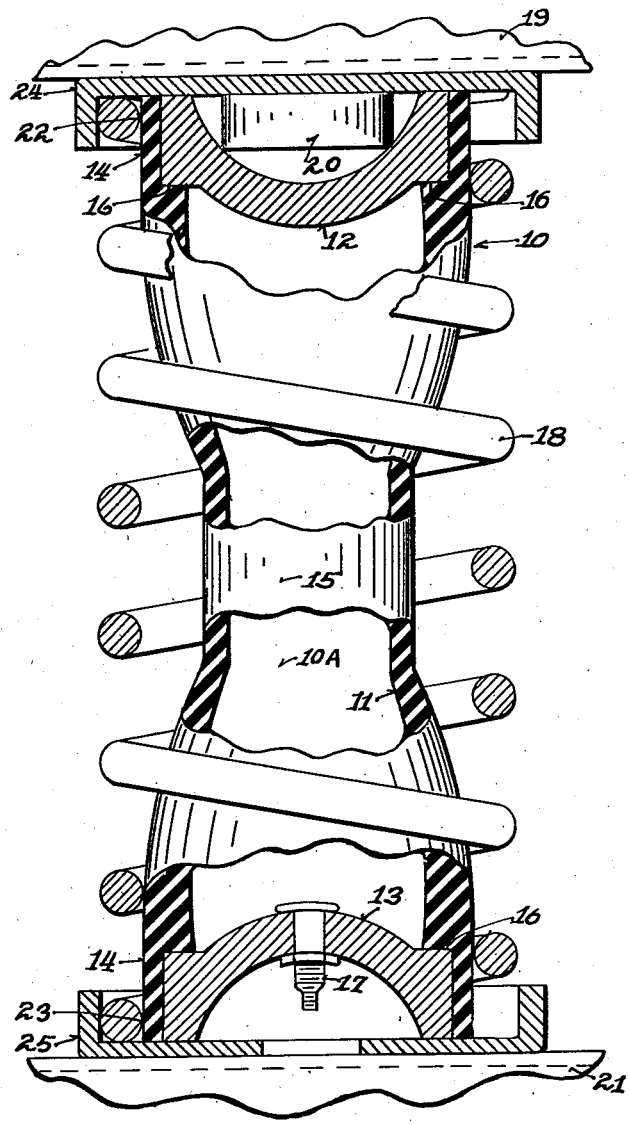
Fig. 1 is a sectional view showing my improved air-controlled spring means in combination with a coil spring.

The air-controlled spring means indicated generally by the numeral 10 comprises a tubular wall section 11 closed at each end with a rigid insert 12 and 13.

The wall section is made of any suitable resilient material, as for example, rubber, and preferably of a comparatively tough rubber similar to the rubber used in the making of automobile tires.

The wall section 11 is cylindrical in form at the ends 14. Each end tapers conically toward each other to a constricted mid-section or expandible portion 15. It is at this mid-section that the resistivity of the spring means is controlled.

The wall portion 11 is corded (not shown) throughout its length with a resilient type of cording which is embedded in the wall and acts to maintain the unsprung and uninflated condition of the spring means or rubber cushion 10.

The wall portion 11 may be molded in the shape shown in Fig. 1, each end of which is formed with a shoulder support 16, on which the inserts 12 and 13 are carried.

The inserts 12 and 13 may be made of metal or hard rubber or any other suitable material shaped in the form of a disc. Each disc is convex relative to each other for purposes of strength. The inserts are secured in air tight relationship with the shouldered ends of the wall 11 in any convenient manner as by vulcanizing in the case of hard rubber inserts, or by the use of any suitable bonding agent.

The lower insert 13 is provided centrally thereof with a valve stem 17, of any common type, whereby air or other suitable gas may be inserted into the air chamber 10A to strengthen the wall 11 against collapse as hereinafter explained.

In operation the rubber cushion 10 is used in the following manner. If, for example, a coil spring 18, is used to resiliently support a load, as for example, a vehicle frame, represented in part at 19 on any suitable support as for example an axle, represented in part at 21, has been weakened due to fatigue of the metal from which the spring is made, or other reasons, and it is desired to compensate for this loss in resistivity, the rubber cushion 10 may be inserted within the convolutions of the spring 18 having its upper and lower ends in close fitting relationship with the spring at 22 and 23 respectively and having ends held in relative alignment and protected by centering cups 24 and 25. The centering cup 24 is provided with a hard rubber centering means 20 received in the concaved side of the insert 12 to aid in securing the cushion in alignment.

If the spring 18 has not been greatly fatigued, the normal resistivity of the rubber cushion 10 will be sufficient to offset the loss in resistivity to the spring 18. However, if the spring has become considerably weakened, then the resistivity of the rubber cushion may be increased by the addition of air into the air chamber 10A through the valve stem 17.

Figure 4:
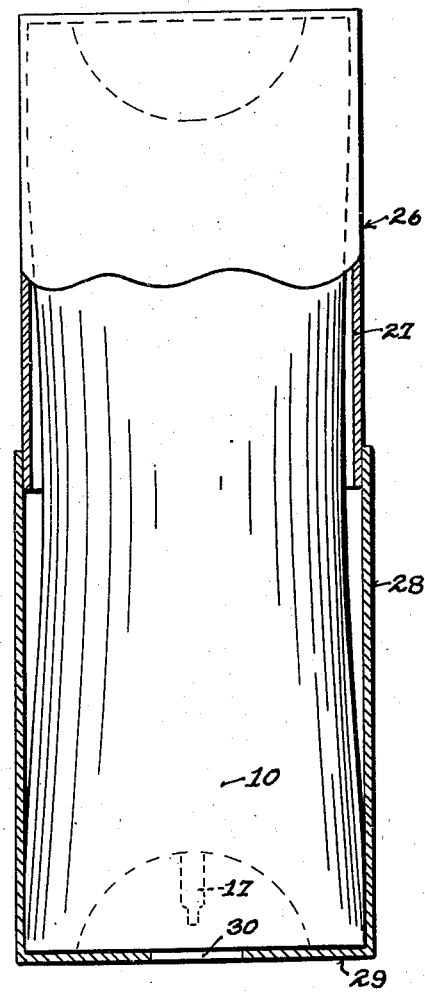
Fig. 4 is a plan view partly in section showing the spring means stiffened with air and in combination with a casing.

By adding air through the valve stem 17 the wall portion 11 is forced laterally outwardly, particularly in the midsection 15 as is clearly shown in Fig. 4. The addition of air causes the wall to become stiffened in a manner similar to that of an inflated automobile tire.

By stiffening the wall 11 in this manner the resistivity of the cushion is increased and the load to be supported is thereby properly suspended.

When the rubber cushion is compressed by means of external forces applied at the opposite ends thereof, the mid-section 15 bulges outwardly (not shown) due to the more resilient nature of the wall at the mid-section, and due to the compression of the air on the inside of the cushion forcing the wall at the mid-section outwardly.

It is to be noted that the thickness of the wall 11 varies from a comparatively thick walled section at each end 14 to a comparatively thin walled section at the mid-section 15. It is because of this construction that the mid-section of the cushion bulges outwardly under compressive forces thereby permitting the cushion to act in a manner similar to a spring. It is found that a common cylindrical shaped resilient wall will not function in the manner of a spring, but that the wall must be formed in the manner indicated in the drawings.

It is noted that the convolutions of the spring 18 acts as a limit within which the wall 11 may be expanded. It is found that under extreme condition of loading, it is necessary to increase the air pressure within the cushion to such an extent, in order to sufficiently stiffen the cushion against compression, that there is a tendency for the wall to bulge outwardly beyond its normal limit. In addition to preventing this by means of the convolutions of the spring 18, a casing 26 has been provided which is adapted to enclose the inflated cushion 10.

The casing 26 comprises an upper section 27 closed at the upper end and telescopically received in a lower section 28. The lower end 29 of the section 28 is provided with an opening 30 through which air means may be connected to the valve stem 17.

Figure 2:
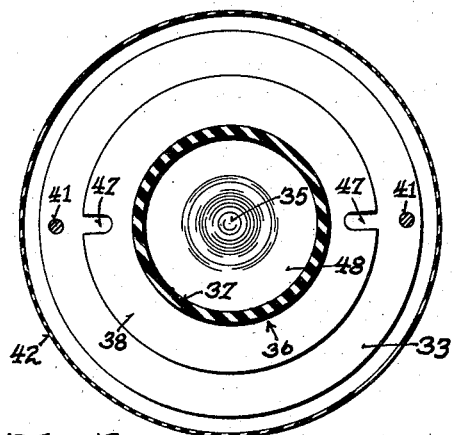
Fig. 2 is a view taken on the line 2—2 of Fig. 3.
Figure 3:
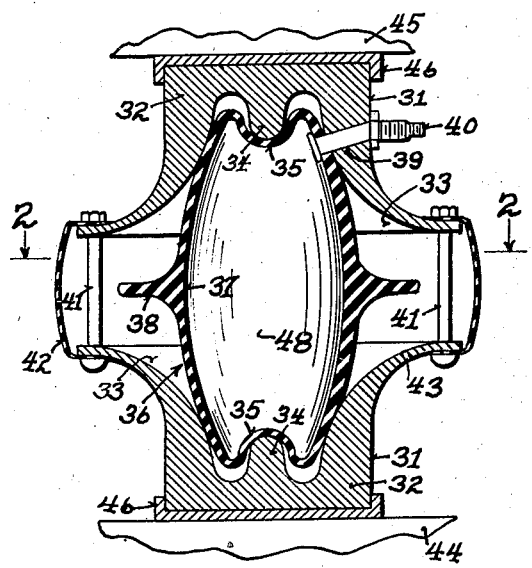
Fig. 3 is a sectional view showing a modified form of my invention.

Figs. 2 and 3 show a modified form of the invention. The spring means comprises a pair of cups 31. Each cup includes a base portion 32 flaring outwardly into a guide wall 33. Centrally, of each base portion 32, is provided a centering nib 34 adapted to receive the cupped end 35 of the spring means 36.

The spring means 36 is formed in a unitary piece of any suitable material, as for example, rubber of the type used in automobile tire construction. The spring means 36 is oval in shape, the opposite ends of which are cupped inwardly at 35 to provide means for mounting and centering the spring means in operative position between the cups 31.

The mid-section 37 of the spring means 36 is reinforced by means of a resilient rubber flange or fin 38 molded peripherally on the mid-section of the spring cushion 36 for purposes hereinafter to be described.

The upper cup 31 is provided with a valve stem opening 39 through which the valve stem 40 may extend from the spring cushion 36 all as clearly shown in Fig. 3.

The cushion 36 is assembled between the cups 31 by positioning the nibs 34 of each cup in a corresponding cupped end 35 of the cushion 36. The cups 31 are held in relative alignment with each other by means of the guide bolts 41 loosely received in the guide wall 33 to permit relative sliding movement thereon of the cups. The spring cushion 36 is sealed between the cups 31 by means of a resilient rubber cover 42 positioned about the outer end of each guide wall 33. The rubber cover 42 protects the cushion 36 against dirt and moisture which would otherwise cause damage to the cushion. A breather hole 43 is provided in the lower cup 31 to permit air to breathe in and out between the cups 31 as the cups are moved toward and away from each other under the action of loading.

The assembled spring means may be inserted between a support, fragmentarily indicated at 44, and a body to be supported, fragmentarily indicated at 45, and held in position by the cups 46. As the body 45 is loaded the cushion 36 expands outwardly against the resistive force of the rubber flange or fin 38. It is to be noted that the reinforcing flange 38 tends to return the spring cushion 36 to its normal unsprung condition. Under extreme conditions of loading the spring means 36 expands outwardly and the cups 31 approach each other until the guide walls 33 are immediately adjacent each other. It is to be noted that the walls are never permitted to come into direct contact with each other because the flange 38 is moved outwardly and disposed between the outer edge of the guide walls 33.

The flange 38 is provided with slots 47 adapted to receive the bolts 41 when the cushion 36 is in the extreme expanded position. The flange 38 therefore serves two useful purposes, one as a resilient means to return the cushion to its original unsprung position and the other to act as a cushion between the guide walls 33 of the cups 31.

The spring assembly may be stiffened against flexure by adding air to the air chamber 48 through the valve stem 40. The air causes the resilient cupped ends 35 of the spring cushion to be stiffened against the nibs 34 of each cup 31.

The spring means shown in Figs. 2 and 3 may also be used as a helper spring in the case of leaf springs liable to be sprung beyond their normal capacity. Under these conditions the spring means 36 is mounted between the leaf springs, as for example those of a truck (not shown), immediately above the axle (not shown) and between the frame of the truck body. In this manner both the leaf spring and the spring means 36 cooperate to suspend the load proportionally. It may be noted that the guide walls 33 of the cup cooperate with the spring cushion 36 to force the walls of the cushion outwardly at the flange 38 where the resiliency of the cushion is concentrated. The guide walls 33 thus prevent straining of the cushion at its weaker sections.

It is to be understood that the spring means hereinbefore described may be used either alone or in combination with coil and/or leaf springs wherever it is necessary to resiliently support a load.

It may be readily realized that the air-controlled spring means may serve many useful purposes. The spring means may be used to restore the resistivity to a "spent" spring, or increase its resistivity. The spring means may be inflated to increase its resistivity under extreme loading conditions, and then deflated after the loading condition has been relieved, thereby providing proper riding conditions under all conditions of load. It may be economically used in combination with a "spent" spring thereby obviating replacement of expensive parts.

From the foregoing it is apparent that the objects of this invention have been accomplished by providing a spring means, having means whereby the resistivity of the spring means may be varied to provide proper resistive supports under any given load condition.

Having thus described my invention, what I claim and desire to secure by Letters Patent is:

1. A pneumatic device of the character described comprising a substantially cylindrical wall element, said wall element being closed at its upper and lower end to provide a chamber, a valve means in communicating relationship with said chamber whereby a predetermined amount of a compressible medium may be inserted into said chamber, and a flexible portion medially said wall element, said portion being of a diameter substantially less than the diameter of the remainder portion of said wall element, said medial portion being adapted to function in combination with said compressible medium to resiliently support said ends of said wall element against movement toward each other.

2. A pneumatic spring means comprising a substantially cylindrical wall element, mounting means adapted to seal the upper and lower end of said wall element whereby to form a chamber, valve means in communicating relationship with said chamber whereby a predetermined amount of a compressible medium may be inserted into said chamber, the medial portion of said wall element being flexible and of a diameter substantially less than the diameter of the remainder portion of said wall element, said medial portion being adapted to function in combination with said compressible medium to resiliently bias said mounting means outwardly relative to each other.

3. A spring means comprising a tubular element having a sprung and unsprung position, relatively stiff cup-like members associated with said tubular element to form an air chamber therewith, valve means carried by said spring means whereby air may be inserted into said chamber to stiffen said tubular element against change in position said tubular element having a flexible portion medially thereof and of a diameter substantially less than the diameter of the remainder of said tubular element.

4. A spring means comprising a comparatively resilient element, the terminal ends of said element flaring outwardly into a cup-like section, the wall portion of each of said sections being of a greater thickness than the thickness of the wall portion of said resilient element, a rigid disc member closing said sections to form an air chamber, valve means whereby air may be inserted into said chamber to stiffen said tubular element against flexure.

5. A spring means comprising a comparatively thin walled section, said section being relatively resilient and flaring outwardly at both ends into a cup-like section, the walls of said cup-like section increasing in thickness and terminating in a shouldered support, a rigid closure element sealed to each of said shouldered supports thereby providing an air chamber for said spring means, a valve means whereby air may be inserted into said chamber to stiffen said thin walled section against flexure.

6. A spring means comprising a comparatively thin walled section, said section being relatively resilient and flaring outwardly at both ends into a cup-like section, the walls of each cup-like section increasing in thickness and decreasing in resiliency, shoulder portions adjacent the end of each cup-like section, an inwardly curved rigid closure element sealed to each of said shoulder supports thereby providing an air chamber for said spring means, a valve means whereby air may be inserted into said chamber to stiffen said sections against flexure.

7. In combination, a casing including telescopically related sections, a spring means carried within said casing, said means including an air chamber the walls of which are gradually tapered mediallyward from opposite ends thereof to form a single constricted and substantially resilient section, and valve means associated with said spring means, said casing acting to limit the expansion of said air chamber during inflation of said spring means.

ARTHUR B. BERTHELMANN.